United States Patent [19]

Okada

[11] Patent Number: 4,651,775

[45] Date of Patent: Mar. 24, 1987

[54] THREE-WAY BALL VALVE

[75] Inventor: Masao Okada, Osaka, Japan

[73] Assignee: Tesco, Inc., Osaka, Japan

[21] Appl. No.: 772,913

[22] Filed: Sep. 5, 1985

[51] Int. Cl.[4] .......................................... F16K 11/087
[52] U.S. Cl. ............................. 137/625.41; 137/625.3; 251/174
[58] Field of Search ........... 137/625.41, 625.4, 625.32, 137/625.31, 334, 625.3; 261/159, DIG. 17, DIG. 16, 50 B

[56] References Cited

U.S. PATENT DOCUMENTS

| | | | |
|---|---|---|---|
| 2,276,073 | 3/1942 | Tidd | 261/159 |
| 2,911,009 | 11/1959 | Parker | 137/625.41 |
| 3,118,650 | 1/1964 | Cooper et al. | 137/625.41 |
| 3,219,325 | 11/1965 | Brown | 137/625.4 X |
| 3,626,966 | 12/1971 | Vanagas | 137/625.4 X |

FOREIGN PATENT DOCUMENTS

| | | | |
|---|---|---|---|
| 741591 | 8/1966 | Canada | 137/625.41 |
| 57-28825 | 6/1982 | Japan . | |

*Primary Examiner*—Robert G. Nilson
*Attorney, Agent, or Firm*—Sandler & Greenblum

[57] ABSTRACT

A three-way ball valve having a valve body containing a valve chamber and three passages in T shape wherein two branch-like passages are for cold water and steam or hot water and the trunk-like passage is for outlet of warm water. A flow controlling ball valve of hollow mushroom-like construction consisting of a spherical part and a cylindrical part, is supported within the valve chamber rotatably about its valve stem axis which is perpendicular to the plane formed by the three passages. The hollow space is divided into two half-cylindrical rooms. Each room has a group of holes through the spherical shell for connecting the room to each inlet passage, and another group of holes through the cylindrical shell to the outside mixing room defined by the remaining space of the valve chamber wherein the flow controlling ball valve is placed. The two inlet fluids flow into the half-cylindrical rooms through the holes at the spherical shell functioning as flow controller, respectively. The fluids flow side by side in the half-cylindrical rooms and flow out through the holes at the cylindrical shell to the mixing room wherein the mixing occurs. The mixed fluid goes out from the outlet passage.

6 Claims, 4 Drawing Figures

THREE-WAY BALL VALVE

BACKGROUND OF THE INVENTION

1. Field of the Invention and Related Art Statement

The present invention relates to a three-way ball valve used for mixing cold water and steam or hot water to make warm water. Such warm water is used for bathing, showering and other household uses and the like.

2. Description of the Background Information

According to the common usage, the "ball valve" used herein means a type of cocks having a flow controlling spherical plug hereinafter designated as a "valve". Such ball valves have the characteristic features that the annular valve seats thereof are surfaces of revolution, and that there is negligible thrusting force acting in the direction of the valve stem.

The most important function of the mixing device is, of course, achieving a good mixing of the water. It is an easy matter to mix two fluids thoroughly by the use of complex and expensive device; it is, however, quite another problem to achieve this in a small constrained space like in the valve chamber of the present invention. The inventor has proposed in Japanese Pat. No. 1139147, a three-way ball valve for mixing cold water and steam which can minimize fluctuation of the mixing ratio of the two fluids, that is, minimize the temperature of the mixed fluid regardless of time or place. Unfortunately, the valve of this type necessitates a poppet valve in addition to the flow controlling ball valve. A three-way ball valve which does not include the poppet valve, which still attains the same level of performance is desirable.

BRIEF SUMMARY OF THE INVENTION

It is accordingly an object of the present invention to provide a three-way ball valve having one flow controlling ball valve, which does not have a poppet valve, for mixing cold water and steam or hot water to make warm water.

Another object of the present invention is to provide a three-way ball valve of the above construction which is less noisy.

Still other objects of the present invention will become apparent from reading of the following disclosure and the accompanying drawings.

To accomplish these and other objects, the present invention contemplates a three-way ball valve having a valve body and a flow controlling ball valve which has the following characteristics.

The valve body comprises a valve chamber and three passages which open into and project from the valve chamber in a T-shape The two sideway passages serve as the inlets for the two fluids to be mixed, hereinafter designated as inlet fluids. The passage perpendicular to the two sideway passages serves as the outlet of the mixed flow and is denoted as the outlet passage. The two opposing sideway passages have, at their respective inner ends, annular valve seats defined by surfaces of revolution which are characteristic of the ball valve.

The flow controlling ball valve is a hollow mushroom-like body resting rotatably about the axis perpendicular to the plane formed by the three passages. The flow controlling ball valve has a spherical part which serves as a flow controller in contact which the valve seats and a cylindrical part with serves as a journal thereof made into a body. The spherical part has a greater diameter than that of the cylindrical part. The flow controlling ball valve also includes a valve stem which projects from the spherical part coaxially with but directing opposite to the cylindrical part. The hollow space in the mushroom-like flow controlling ball valve is divided into two half-cylindrical rooms by a separating wall extending parallel to the axis of the valve. Each room has two groups of small holes suitably distributed around the remaining mushroom-like shell which extend to the outside of the room. One group of holes is located at the spherical part and the other is located at the cylindrical part. The inlet fluids flow through the respective inlet passages, flowing the half-cylindrical rooms through the holes located around the spherical shell. The two fluids flow side by side in the half-cylindrical rooms toward the cylindrical part and leave the rooms through the holes perforated around the cylindrical shell, flowing into the outside space defined by the outer face of the mushroom-like ball valve and the inner face of the valve chamber. This is known as the mixing room. The inlet fluids are mixed in the mixing room and flow out through the outlet passage as the mixed fluid.

The separating wall which bisects the cylindrical hollow space into two rooms functions as a heat transferring wall between the respective inlet fluids and, at the same time, as a resister to both fluid flows causing pressure loss and concomitant turbulence, these in turn enhancing the heat transfer. Again, for steam, since its condensation temperature decreases with a decreased pressure, it can remain as vapor at a lower temperature, and this causes the temperature difference of the inlet water and steam to decrease. Such decreases in pressure and temperature differences lead to reduction of temperature fluctuations and noise generation.

The holes at the spherical shell are distributed so that, first the valve is closed, and with an increased angle of the valve rotation from the reference state the temperature of the outlet fluid varies from cold to hot.

BRIEF DESCRIPTION OF THE DRAWINGS

The present invention will now be described with reference to the accompanying drawings wherein like reference characters designate like or corresponding parts throughout several views, in which.

DESCRIPTION OF THE PREFERRED EMBODIMENT

An exemplary embodiment of the present invention is now explained.

Figure 1:
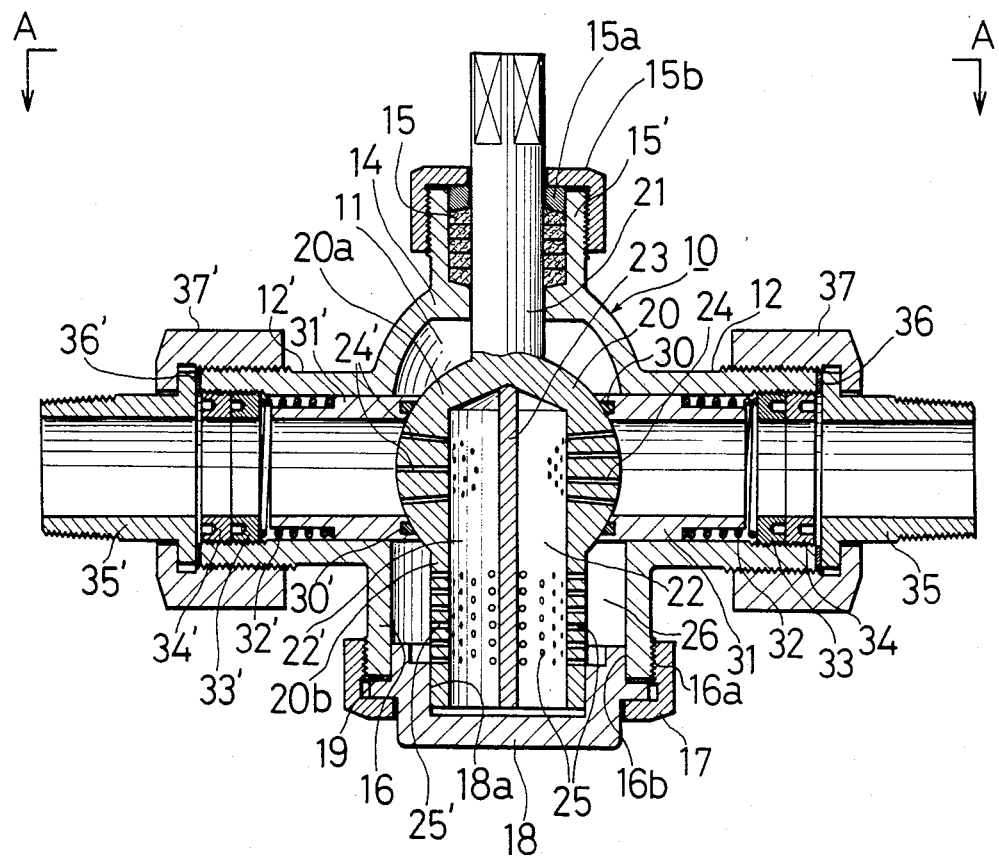
FIG. 1 is a longitudinal sectional view of the valve of the present invention.
Figure 2:
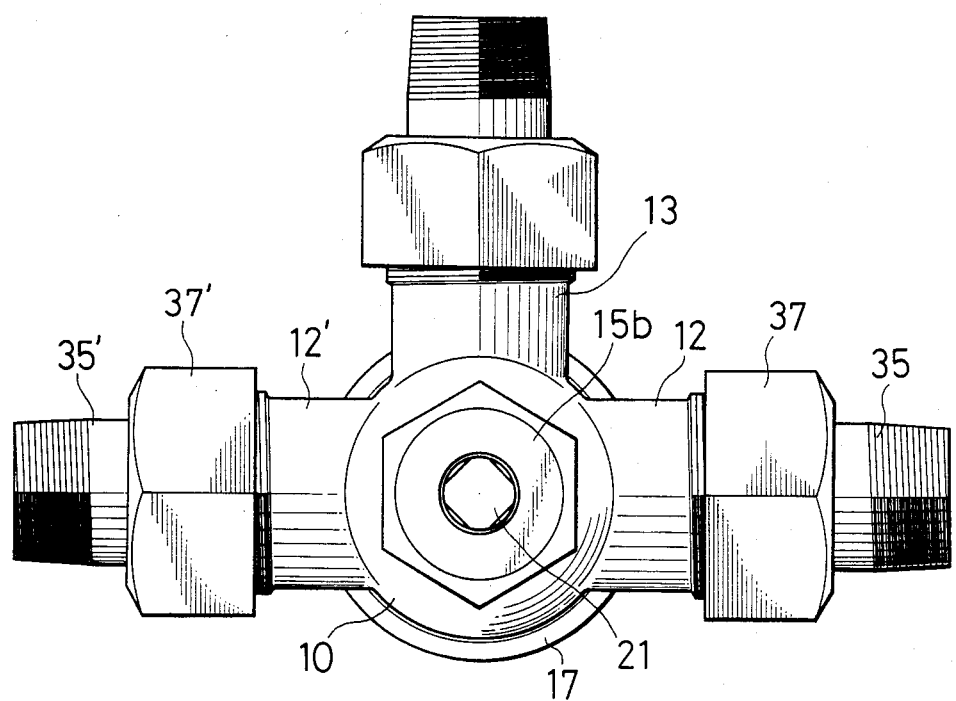
FIG. 2 is a view taken in the direction of the arrows along line A—A of FIG. 1.

As illustrated in FIG. 1, valve body 10 includes a valve chamber 11 which is a hollow space to accept the ball valve 20. Valve body 10 has three fluid passages projecting therefrom in a T-shape, wherein two branch-like passages 12, 12' function as the fluid inlets and the remaining trunk-like passage 13 perpendicular thereto, functions as the fluid outlet, as best illustrated in FIG. 2.

Included as part of the valve body 10 is a bonnet 14 which projects at a right angle to the plane formed by the three passages 12, 12' and 13, to cover the valve chamber 11. Part of bonnet 14 is used as a stuffing box 15' to accept gland packing 15 to support the valve stem 21 so that fluid cannot pass. The packing 15 is pressed by gland 15a and gland nut 15b in a conventional manner. On the opposite side of the valve body 10 from bonnet 14, projects a hollow cylinder 16 having external threads 16a at its far end. The cap 18 includes internal bearing recess 18a attached to the end face by the aid of gasket 19 and fastening nut 17 so that fluid cannot pass.

A flow controlling ball valve 20 has a hollow mushroom-like construction which consists of a spherical part 20a and a cylindrical part 20b made into a body. Spherical part 20a is is greater in diameter than cylindrical part 20b. Valve stem 21 extends from the spherical part 20a coaxially with but opposite to the cylindrical part 20b.

To assemble the valve, the ball valve 20 is inserted in place through the opening 16b of the hollow cylinder 16. The ball valve 20 is supported rotatably by the gland packing 15 at the valve stem 21 thereof and by the bearing recess 18a into which the end of the cylindrical part 20b is journaled.

The ball valve 20 attaches in sliding engagement with the annular valve seats 30, 30' located at the innermost parts of the passages 12, 12'. The common center line of the passages 12 and 12' just passes the center of the sphere defined by the spherical part 20a. Hence, the valve seats 30, 30' have surfaces of revolution, respectively, as contact land.

Figure 4:
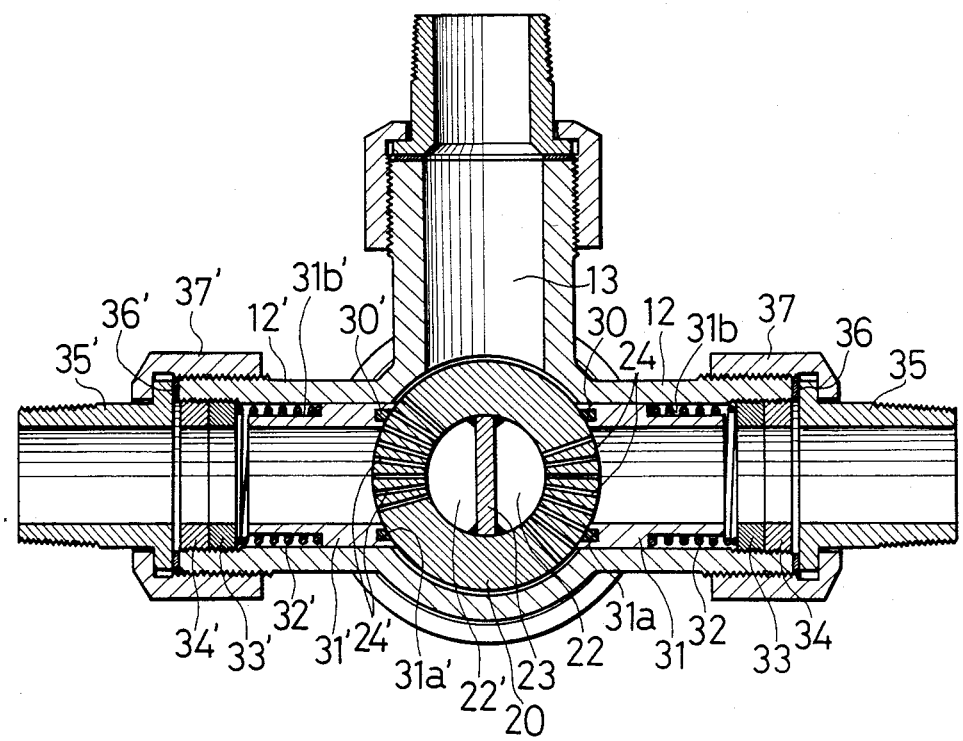
FIG. 4 is a sectional view of the valves as shown in FIG. 2 to illustrate how the holes at the spherical shell relate to the passages within the valve seats.

As best shown in FIG. 4, valve seats 30, 30' are embedded in the annular grooves 31a, 31a' located at the inner ends of the shouldered sleeves 31, 31', respectively. Sleeves 31, 31' are pressed inwardly by the coiled springs 32, 32' located at the narrowed parts 31b, 31b' of sleeve 31, 31', respectively. The coiled springs 32, 32' are supported, in turn, by the externally threaded ring members 33, 33' and further by lock members 34, 34' respectively. The outermost ends of the passages 12, 12' are attached to the connecting collared members 35, 35'. Gaskets 36, 36' are interposed between the ends of passages 12, 12' and collared members 35, 35' and are fastened by the connecting nuts 37, 37', respectively, such that fluid cannot pass.

The hollow space in the ball valve 20 is a cylindrical room with its axis coincident with the rotational axis of the valve, and open only to the end face of the cylindrical part 20b. Although the hollow space shown in FIG. 1 is an ordinary straight cylinder, the term "cylinder" in this case should be interpreted in a more comprehensive sense including the mushroom-like configuration which is a surface of revolution. Again, the hollow space is open at the end face only for ease of fabrication and should not be interpreted as restrictive.

The hollow space is divided into two half-cylindrical rooms 22, 22' by a separating wall 23 extending parallel to the rotational axis of the valve 20. As best illustrated in FIG. 4, each of the rooms has two groups of distributed small holes 24, 25 or 24', 25' perforated through the valve shell as defined by the hollow rooms 22 or 22' and the mushroom-like outside conformation.

The inlet fluids, cold water, and steam or hot water, flow through the respective passages 12, 12' into the respective half-cylindrical rooms 22, 22' through the small holes 24, 24' located around the spherical shell. The two fluids move side by side, each in its respective room and leave the rooms 22, 22' through the holes 25, 25' to the outside space or the mixing rooms 26. Mixing room 26 is the remaining space in the valve chamber 11 after the ball valve 20 is placed. The fluids are sufficiently mixed therein and exit from mixing room 26 through the outlet passage 13 as the mixed fluid as shown in FIG. 4. With the presence of heat conductive material such as a net or bar of stainless steel or aluminum, it is possible to obtain more uniformly warmed water.

The separating wall 23 which bisects the cylindrical hollow space into two half-cylindrical rooms 22, 22' functions as a heat transferring medium between the respective inlet fluids and, at the same time, as a resistor to the fluid flow. As is well known, mixing of hot steam and cold water is accompanied with violent vibration and noise known as water hammering. This phenomenon can be calmed down by reducing the temperature difference between steam and water. With lowered pressure, steam, or water vapor can remain as vapor at a lower temperature. The heat lost by the steam transfers to the water running side by side and raises its temperature. Thus the separating wall 23 contributes to the reduction of vibration and noise, and also the reduction of temperature fluctuation.

Figure 3:
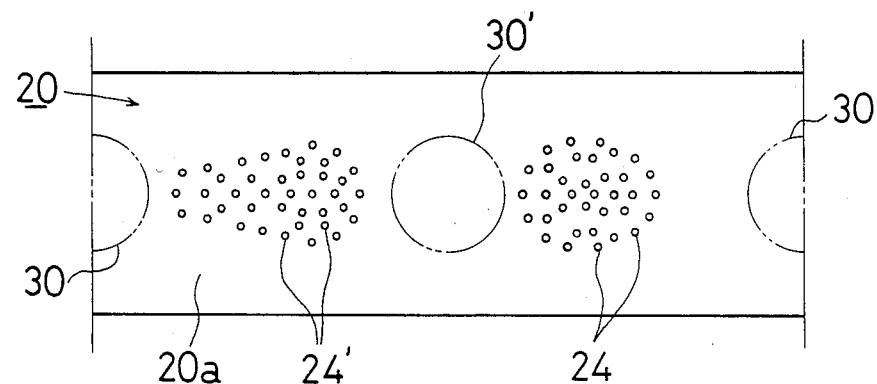
FIG. 3 is a Mercator development of the spherical shell of the ball valve to show an example of the distributed holes which serve to control the flow rate.

An example of the small hole distribution at the spherical shell is shown in FIG. 3 in which holes 24 and 24' represent steam and cold water respectively on the Mercator development of the spherical shell. The phantom inlet passage within the valve seats 30, 30' move from right to left in FIG. 3, or the valve turns clockwise from the closed position to the open position. As seen in FIG. 3, at first cold water is dominant, but with the valve opened, the flow of steam or holes 24 in the phantom passage increase and those for cold water decrease and the temperature of the outlet fluid or the warm water rises.

The distribution of holes 25, 25' at the cylindrical part 20b is less important, so that simple uniform distribution will be preferrable.

As the present invention may be embodied in several forms without departing from the spirit of essential characteristics thereof, the present embodiment is therefore illustrative and not restrictive, since the scope of the present invention is defined by the appended claims rather than by the description preceeding them, and all changes that fall within meets and bounds of the claims, or equivalence of such meets and bounds are therefore intended to embraced by the claims.

What is claimed is:

1. A three-way valve comprising:
    (a) a valve body including inlet passages for receiving fluids and a valve chamber to which said passages are connected, said valve body further comprising at least two removable valve seats for sealing flow control means from said inlet passages and at least two sleeves, each of said sleeves having a narrow portion and a relatively wide portion, one of said at least two valve seats being embedded in said wider sleeve portion, and a coil spring positioned about said narrow sleeve portion for biasing said at least two valve seats towards said flow control means to provide a tight seal between said flow control means and said inlet passages;
    (b) flow control means having a spherical input portion, an output portion, and means for rotatably mounting said flow control means in said valve chamber, said flow control means adapted to be rotated about an axis substantially perpendicular to said inlet passages, said flow control means having means defining a hollow space, said valve body and said flow control means defining a mixing chamber having an outlet passage for egress of mixed fluid, said flow control means including separating means for preventing intermixing of fluids of different temperatures in said hollow space until the temperature difference of the fluids is reduced, said separating means comprising a heat conductive, axial wall dividing the hollow space into two regions;

(c) inlet apertures in said input portion of said flow control means for connecting the inlet passages to said means defining a hollow space when said flow control means is in a predetermined angular position, and outlet apertures in said output portion of said flow control means for connecting said means defining a hollow space to said mixing chamber, said inlet apertures comprising two different aperture patterns which are respectively associated with the inlet passages for controlling the passage of fluid from each of the inlet passages into said hollow spaces, dependent upon the angular position of the flow control means, wherein the aperture pattern which is associated with one inlet passage for a lower temperature fluid will effect passage of said lower temperature fluid into one of two said regions of said hollow space before the aperture pattern which is associated with an outlet passage for a higher temperature fluid effects passage thereof into another of said two regions when said flow control means is rotated.

2. A three-way valve according to claim 1 wherein the pattern associated with the inlet passage for the lower temperature fluid is circumferentially more elongated than the pattern associated with the inlet passage for the higher temperature fluid.

3. A three-way valve according to claim 2 wherein the output portion of said flow control means is cylindrical with its axis being colinear with the axis of rotation of said flow control means.

4. A three-way valve according to claim 1 wherein said means defining a hollow space is cylindrical.

5. A three-way valve according to claim 4 wherein said aperture means includes a second group of holes in said output portion for controlling the passage of fluid from the respective regions of said means defining a hollow space and into said mixing chamber.

6. A three-way valve according to claim 4 wherein said mixing chamber is annular and surrounds said output portion.

* * * * *